United States Patent
Fujii et al.

(10) Patent No.: US 7,216,826 B2
(45) Date of Patent: May 15, 2007

(54) MAGNETIC TAPE CARTRIDGE

(75) Inventors: Akihiko Fujii, Kanagawa (JP); Kiichiro Kitagawa, Kanagawa (JP); Seiji Tsuyuki, Kanagawa (JP); Seiji Oodate, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 368 days.

(21) Appl. No.: 10/892,367

(22) Filed: Jul. 16, 2004

(65) Prior Publication Data

US 2005/0023394 A1 Feb. 3, 2005

(30) Foreign Application Priority Data

Jul. 31, 2003 (JP) .............................. 2003-284166

(51) Int. Cl.
*G11B 23/107* (2006.01)
(52) U.S. Cl. ...................................... 242/348; 360/132
(58) Field of Classification Search ................ 242/343, 242/348, 348.2; 360/132
See application file for complete search history.

(56) References Cited

U.S. PATENT DOCUMENTS

2002/0085312 A1* 7/2002 Morita et al. ............... 360/132

FOREIGN PATENT DOCUMENTS

| JP | 11-250618 A | 9/1999 |
|---|---|---|
| JP | 11-250620 A | 9/1999 |
| JP | 11-260028 A | 9/1999 |
| JP | 11-260029 A | 9/1999 |
| JP | 11-273307 A | 10/1999 |
| JP | 2000-339911 A | 12/2000 |
| JP | 2001-118354 A | 4/2001 |
| JP | 2001-266533 A | 9/2001 |
| JP | 2002-197833 A | 7/2002 |
| JP | 2003-16761 A | 1/2003 |
| JP | 2004-86947 A | 3/2004 |

* cited by examiner

*Primary Examiner*—John Q. Nguyen
(74) *Attorney, Agent, or Firm*—Sughrue Mion, PLLC

(57) ABSTRACT

A magnetic tape cartridge includes a reel around which a magnetic tape is wound, a cartridge case rotatably accommodating the reel, a reel lock for locking rotation of the reel relative to the cartridge case, a resilient member urging the reel lock toward the reel, a release pad for disengaging the reel lock by displacing the reel lock against an urging force of the resilient member, so as to allow rotation of the reel, and a pivot provided on the reel lock at a position facing with and slidably contacting a contact surface of the release pad in a manner allowing rotation of the release pad. The pivot and the contact surface are both made of resin, and the contact surface is made of a resin having a higher hardness than the pivot.

19 Claims, 4 Drawing Sheets

MAGNETIC TAPE CARTRIDGE

BACKGROUND OF THE INVENTION

An apparatus consistent with the present invention relates to a magnetic tape cartridge, and more particularly to a magnetic tape cartridge which can prevent wear of the contact portion provided on the release pad to be rotated.

As a magnetic tape cartridge utilized for an external memory medium for backup of data of a computer and the like, there is a conventionally known magnetic tape cartridge that satisfies a so-called LTO (Linear Tape Open) standard. Such a magnetic tape cartridge rotatably accommodates a reel, onto which is wound a magnetic tape, in a cartridge case. In order to prevent an undesired rotation of the reel at a time when the magnetic tape cartridge is not in use, the rotation of the reel is locked by a reel lock that is usually urged toward the reel by means of a compression coil spring. The reel is unlocked during the use of the magnetic tape cartridge. The contact surface of the release pad urges a pivot provided at a center of the reel lock in an upward direction against the resilient force of the compression coil spring to disengage the lock state of the reel. During the use of the magnetic tape cartridge, the contact surface of the release pad and the pivot of the reel lock always contact each other while allowing the relative rotation thereof. The term "during the use of the magnetic tape cartridge" indicates a state where the reel drive mechanism of the drive device rotates the reel.

When the reel rotes, the urging force F is locally focused on the contacting point between the pivot of the reel lock and the contact surface of the release pad. Therefore, the contact surface suffers from partial wear by an extensive and long term use of the magnetic tape cartridge. Once partial wear occurs at the contact surface, the contact between the reel lock and the release pad becomes unstable which makes the reel lock tilt. This generates vibrations to be transmitted to the whole cartridge case, so that a strange noise occurs. This kind of problem becomes more and more serious with increasing demands for reading out the data or searching the program at high speed and also with increased speed of the rotation of the reel.

Therefore, in order to prevent wear of the contact surface, Japanese Laid-open Patent Application No.2002-197833 (paragraph 0016, and FIG. 5) discloses to attach a metal plate on the release pad to form the contact surface.

However, this conventional magnetic tape cartridge requires another assembling process to attach a metal plate on the contact surface of the release pad, leading to increased manufacturing cost.

SUMMARY OF THE INVENTION

In view of the foregoing drawbacks of the prior art, the present invention seeks to provide a magnetic tape cartridge, which can prevent wear of the contact surface of the release pad and which can prevent an increase in the manufacturing cost.

It is an aspect of the present invention to provided a magnetic tape cartridge including: a reel around which a magnetic tape is wound; a cartridge case rotatably accommodating the reel; a reel lock for locking rotation of the reel relative to the cartridge case; a resilient member urging the reel lock toward the reel; a release pad for disengaging the reel lock by displacing the reel lock against an urging force of the resilient member, so as to allow rotation of the reel; and a pivot provided on the reel lock at a position facing with and slidably contacting a contact surface of the release pad in a manner allowing rotation of the release pad. In this magnetic tape cartridge, the pivot and the contact surface are both made of resin, and the contact surface is made of a resin having a higher hardness than the pivot.

With this construction of the magnetic tape cartridge, when the magnetic tape cartridge is loaded into a drive to run the magnetic tape, the reel rotates around the contact surface at which the pivot and the release pad are contact each other. The urging force focuses on the contact surface, and further the sliding rotation generates friction energy between the reel lock and the release pad. However, since the contact surface of the release pad is made of a resin having higher hardness than the pivot, the pivot is firstly worn and consumes the friction energy. Therefore, the contact surface of the release pad is unworn and keeps a smooth surface.

In the aforementioned magnetic tape cartridge, the pivot may be made of a resin having Vickers hardness value of 10 to 16, and the contact surface may be made of a resin having Vickers hardness value of equal to or greater than 18.

According to this magnetic tape cartridge, the relation of the hardness between the contact surface of the release pad and the pivot of the reel lock is defined by Vickers hardness value. Herein, Vickers hardness value is a value obtained by a measurement that satisfies "Vickers hardness test-testing method" defined by JISZ2244.

In the aforementioned magnetic tape cartridge, the contact surface may be made of a different resin than the other part of the release pad.

According to this magnetic tape cartridge, the release pad and the contact surface are compositely molded by different resins. The pivot and the contact surface may be made of any known different resins having the above relation of the hardness, and the main body of the release pad may be made of, for example, nylon resin which is cheap and excellent in formability.

In the aforementioned magnetic tape cartridge, the pivot may be made of a different resin than the other part of the reel lock.

According to this magnetic tape cartridge, the reel lock and the pivot are compositely molded by different resins. The pivot and the contact surface may be made of any known different resins having the above relation of the hardness, and both the reel lock and the release pad or the main body of the reel lock may be made of, for example, nylon resin which is cheap and excellent in formability.

In the aforementioned magnetic tape cartridge, the pivot may be made of a resin selected from the group consisting of polyacetal (POM), poly buthylene terephthalete (PBT) and nylon, and the contact surface may be made of a resin selected from the group consisting of polyacetal (POM), poly buthylene terephthalete (PBT), nylon, fiber-reinforced PBT, fiber-reinforced POM, and fiber-reinforced nylon.

According to this magnetic tape cartridge, the pivot and the contact surface may be made of the following combinations of resins. These are (POM/PBT), (POM/nylon), (POM/fiber-reinforced PBT), (POM/fiber-reinforced POM), (POM/fiber-reinforced nylon), (PBT/POM), (PBT/nylon), (PBT/fiber-reinforced PBT), (PBT/fiber-reinforced POM), (PBT/fiber-reinforced nylon), (nylon/POM), (nylon/PBT), (nylon/fiber-reinforced PBT), (nylon/fiber-reinforced POM), and (nylon/fiber-reinforced nylon).

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which.

DETAILED DESCRIPTION OF EXEMPLARY EMBODIMENT OF THE INVENTION

With reference to the accompanying drawings, in particular from FIGS. 1 to 3 when necessary, an embodiment of a magnetic tape cartridge according to the present invention will be described. In FIG. 2, the reel lock is shown upside-down.

Figure 1:
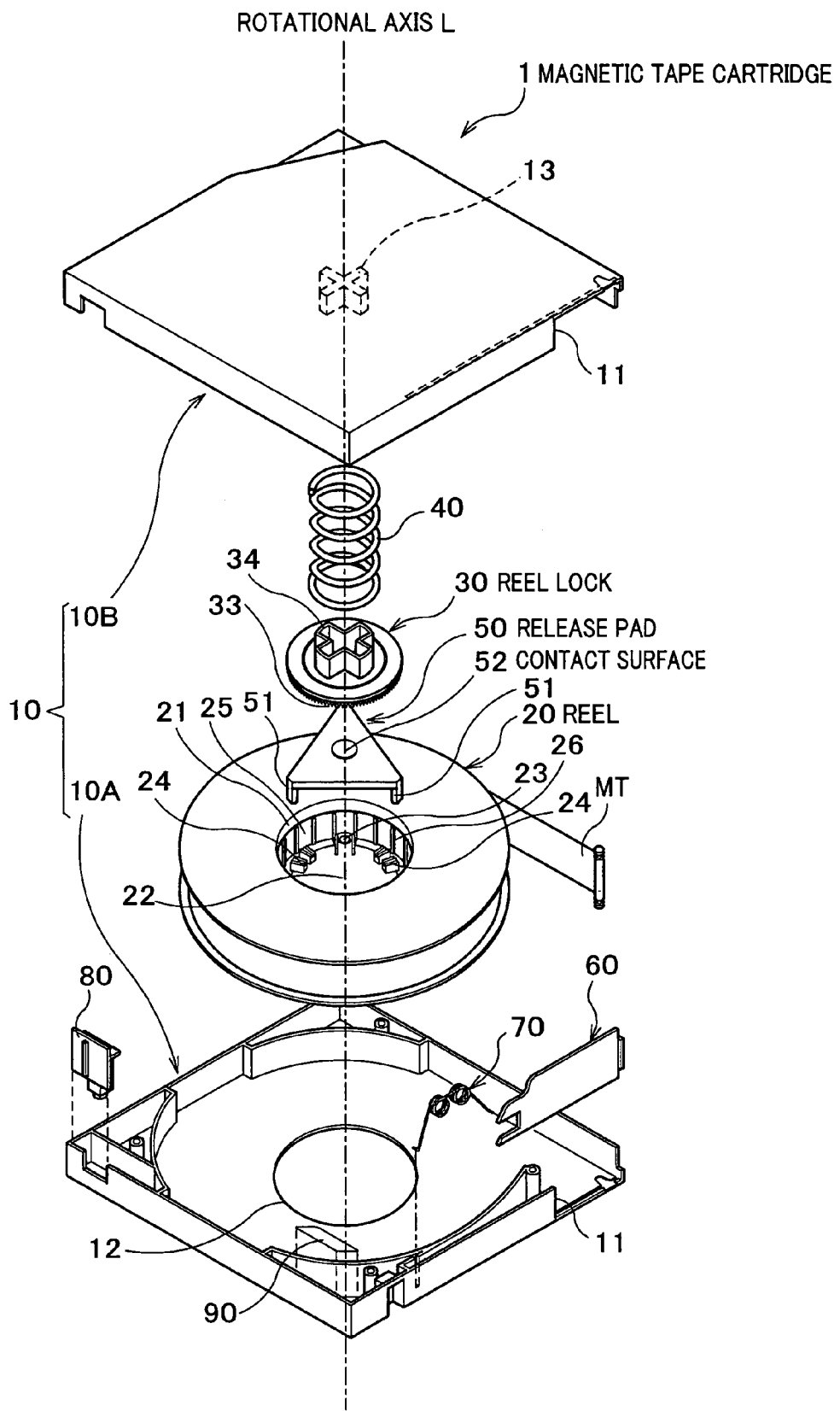
FIG. 1 is an exploded perspective view illustrating structural elements of a magnetic tape cartridge according to the present invention.
Figure 2:
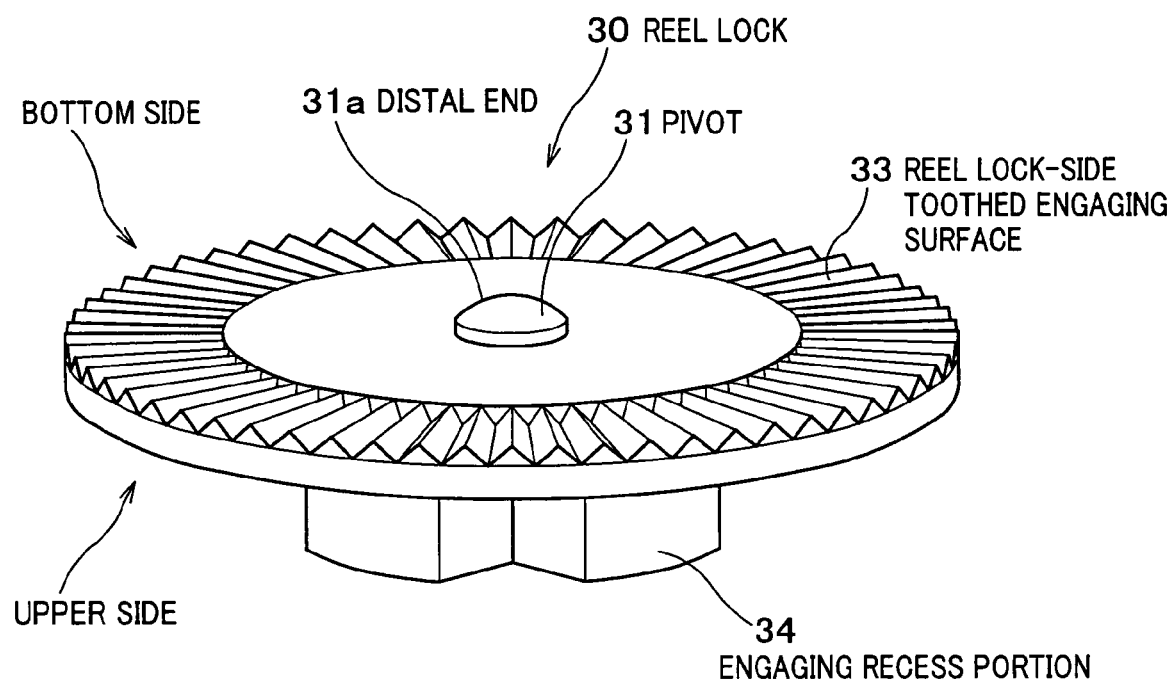
FIG. 2 is an enlarged perspective view illustrating a reel lock of the magnetic tape cartridge.

With reference to FIG. 1, the whole construction of the magnetic tape cartridge will be described. The magnetic tape cartridge 1 shown in FIG. 1 satisfies the LTO standard. The magnetic tape cartridge 1 includes a cartridge case 10 separately formed by a lower half 10A and an upper half 10B. Within the cartridge case 10 are accommodated and assembled a reel 20 around which a magnetic tape MT is wound, a reel lock 30 and a compression coil spring 40 for locking the rotation of the reel 20, a release pad 50 for releasing or disengaging the locked state of the reel 20, a slide door 60 for opening and closing a tape-leading opening 11 which extends over the lower half 10A and the upper half 10B of the cartridge case 10, a torsion coil spring 70 for urging the slide door 60 to close the tape-leading opening 11, a safety lug 80, and a cartridge memory chip 90. A circular opening 12 is provided at a bottom center of the lower half 10A such that the outer surface (not shown) of the bottom portion 22 of the hub 21 is exposed to view from the cartridge case 10.

As shown in FIG. 1, the reel 20 includes a cup-shaped hub 21 at its center. The cup-shaped hub 21 opens toward the upper half 10B. Provided at the inner periphery of the bottom portion 22 of the hub 21 are three equidistant through-holes 23 (only one through-hole is shown in FIG. 1) for inserting lock releasing pins 51 that project downwardly from the bottom surface of the release pad 50. Further, at the inner periphery of the bottom portion 22 of the hub 21, there are provided three equidistant hub-side engaging portions 24 (two engaging portions are shown in FIG. 1) between the three through-holes 23. Provided at the upper surface of each engaging portion 24 is a toothed engaging surface having radially extending bladed projections with a triangular section. Plurality of reinforcement ribs 26 are provided on the inner peripheral wall 25 of the hub 21. The reinforcement ribs 26 extend vertically and are arranged off the through-holes 23. The release pad 50, the reel lock 30, and the compression coil spring 40 are assembled in order within the hub 21.

As shown in FIG. 2, the reel lock 30 includes an engaging recess portion 34, a reel lock-side toothed-engaging surface 33, and a pivot 31. The reel lock 30 is integrally molded by POM (polyacetal) resin. Herein, POM resin has Vickers hardness in the range from 12 to 21 in accordance with its kind. In this embodiment, a POM resin having a relatively low Vickers hardness value such as of 12 is used. The size of the reel lock 30 is determined so as to be accommodated in the hub 21 of the reel 20.

The pivot 31 is provided at the center of the disk-like bottom portion of the reel lock 30. The distal end 31a of the pivot 31 forms a convex curve, and contacts a contact surface 52 of the release pad 50 (FIG. 1) to be described later in a manner allowing rotation of the release pad 50 and the reel 20 that is integrally rotated with the release pad 50.

The reel lock-side toothed-engaging surface 33 is provided at the bottom periphery of the reel lock 30. The toothed-engaging surface 33 has radially extending bladed projections with a triangular section, and is engageable with the hub-side engaging portions 24 (FIG. 1). The resilient force (urging force) F that is applied from the compression coil spring 40 to the reel lock 30 makes the reel lock-side toothed-engaging surface 33 engage with the hub-side engaging portions 24, thereby reliably locking the rotation of the reel 20.

The engaging recess portion 34 is provided at the center of the upper surface of the reel lock 30. The engaging recess portion 34 is a crisscross recess, into which an engaging projection 13 formed at the inner center of the upper half 10B is inserted so as to guide the reel lock 30 in the vertical direction. The engaging recess portion 34 functions to move the reel lock 30 only in the vertical direction as well as to lock the rotating movement of the reel lock 30.

Figure 3:
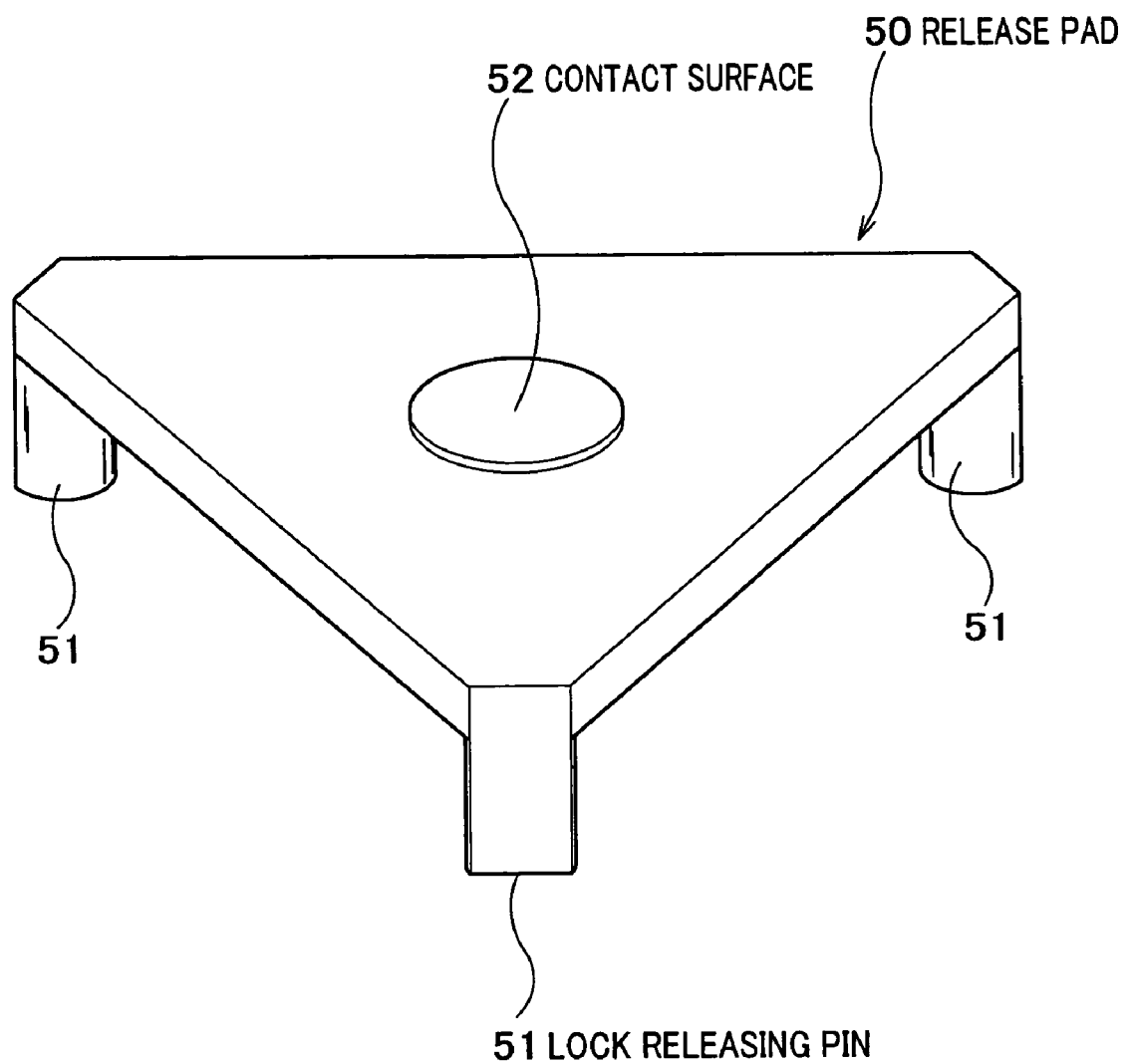
FIG. 3 is an enlarged perspective view illustrating a release pad of the magnetic tape cartridge.

As shown in FIG. 3, the release pad 50 includes a contact surface 52 and lock releasing pins 51. The release pad 50 is integrally molded by PBT (poly buthylene terephthalete) resin. Herein, PBT resin has Vickers hardness in the range from 12 to 21 in accordance with its kind. In this embodiment, a PBT resin having a high Vickers hardness value such as of 20 is used.

The contact surface 52 is formed on the center of the release pad 50 substantially in the form of a triangular plate, and provides a smooth surface. Because the contact surface 52 is smooth, it is possible to reduce friction energy generated by the relative rotation between the contact surface 52 and the distal end 31a of the pivot 31 (FIG. 2) under the resilient force F. In FIG. 3, the contact surface 52 is shown to have a circular shape. However, the contact surface 52 may have any other shapes as long as it contains an area which contacts the distal end 31a of the pivot 31. The contact surface 52 may be formed entirely over the upper surface of the triangular plate.

The lock releasing pins 51 project from the apexes of the substantially equilateral triangle plate member of the release pad 50 in a manner perpendicular to the plate member. These three lock releasing pins 51 are inserted through the corresponding through-holes 23 (only one through-hole is shown in FIG. 1), so as to move the release pad 50 relative to the reel 20 only along the axial direction of the rotational axis L, thereby restricting the movement of the release pad 50 in the rotating direction.

Figure 4:
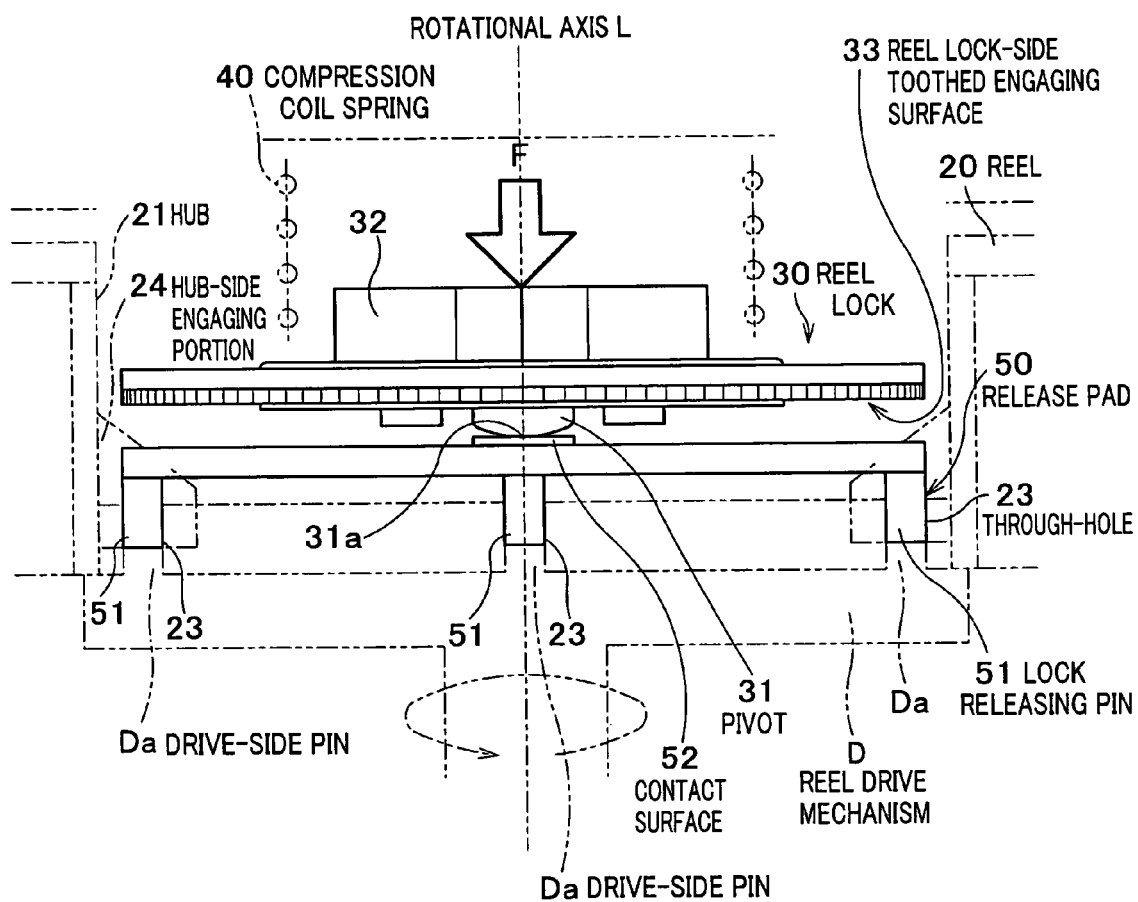
FIG. 4 is an enlarged front view showing the reel lock and the release pad slidably and rotatably contacting each other, wherein the release pad forms a rotation center part of the reel that is rotatably driven within the magnetic tape cartridge when the magnetic tape cartridge is loaded in a drive device.

With reference to FIGS. 1 and 4, operation of the reel lock 30 and the release pad 50 will be described. FIG. 4 is an enlarged view schematically illustrating the contact state of the reel lock and the release pad when the magnetic tape cartridge is loaded in the drive device When the magnetic tape cartridge 1 is loaded in the drive device, the drive-side pins Da of the reel drive mechanism D are fitted into the corresponding through-holes 23 from the bottom portion 22 of the hub 21 that is exposed to view through the circular opening 12, so that the lock releasing pins 51 are urged upward against the resilient action of the compression coil spring 40 to thereby displace the release pad 50 upward. Therefore, the engagement between the hub-side engaging portions 24 and the reel lock-side toothed-engaging surface 33 are disengaged.

The reel lock 30 contacts the contact surface 52 at the distal end 31a, and presses the rotation center of the reel 20 by the resilient force F of the compression coil spring 40. When the drive device drives the reel 20 and therefore the contact surface 52, the distal end 31a of the pivot 31 slidably contacts the contact surface 52 of the release pad 50 in a manner allowing rotation of the release pad 50.

After repeated rotation of the reel 20 over extensive and long term period, the distal end 31a usually causes wear by friction energy generated between the contact surface 52 and the distal end 31a. However, according to this magnetic tape cartridge, because the hardness of the contact surface 52 is greater than that of the pivot 31, the contact surface 52 remains unworn and keeps a smooth surface. On the contrary, comparing with the contact surface 52, wear mainly occurs on the pivot 31. However, even if wear occurs on the distal end 31a of the pivot 31, a stable contact between the distal end 31a and the contact surface 52 is kept unless the planarity of the contact surface 52 is lost. As the result, it is possible to prevent the reel lock 30 from being tilted by the rotation of the reel 20, thereby restricting vibrations and an occurrence of a strange noise due to the vibrations.

Further, the reel lock 30 and the release pad 50 as structural elements of the present invention are both integrally molded, so that they can be manufactured without modifying the conventional manufacturing processes. Therefore, execution of the present invention does not result in an increase of the manufacturing cost.

In the above embodiment, the reel lock 30 including the pivot 31 is made by POM resin, and the release pad 50 including the contact surface 52 is made by PBT resin having a higher hardness than POM resin. However, the present invention is not limited to this specific combination of the resins, and various combinations of the resins may be made without departing from the scope of the present invention. To be more specific, the contact surface 52 may be made of a resin having Vickers hardness of equal to or greater than 18, preferably equal to or greater than 20. The pivot 31 may be made of a resin having Vickers hardness of 10 to 16, preferably 11 to 13. Further, the hardness of the contact surface 52 may be retained with the use of reinforcing material (fiber-reinforced PBT and fiber-reinforced nylon), such as FRP (fiber reinforced plastic).

Further, in the above embodiment, the pivot 31 and the contact surface 52, which are rotatably contacting each other, are molded integrally with their main bodies, that is, the reel lock 30 and the release pad 50. However, the molding method may be modified without departing from the scope of the present invention. For example, the pivot 31 and the contact surface 52 may be made by different materials from their main bodies so that they have a hybrid structure formed by two-color molding. To be more specific, the pivot 31 and the contact surface 52 may be made by any known resins having the previously described Vickers hardness values, and the main bodies of the reel lock 30 and the release pad 50 may be made by nylon resin, which is cheap and excellent in formability.

As described above, because the release pad 50 and the reel lock 30 have a hybrid structure, only the contact surface 52 and the pivot 31 which rotatably contact each other are formed by resin having higher hardness. This can prevent the deteriorated formability of the release pad 50 and the increased material cost.

Herein, the two-color molding is a molding method for manufacturing a product that is integrally formed by two different kinds of resins. As a typical example process of the two-color molding, two pairs of molds for primary and secondary molding are used. A first material is injected and molded through the first cylinder into the primary mold. After the mold is opened with the first product positioned on the core side, a second material is injected and molded through the second cylinder over the first product and into the secondary mold. The two-color molded product is obtained by removing it from the secondary mold to be opened.

What is claimed is:

1. A magnetic tape cartridge comprising:
   a reel around which a magnetic tape is wound;
   a cartridge case rotatably accommodating the reel;
   a reel lock for locking rotation of the reel relative to the cartridge case;
   a resilient member urging the reel lock toward the reel to lock the reel;
   a release pad for disengaging the reel lock by displacing the reel lock against an urging force of the resilient member, so as to allow rotation of the reel; and
   a pivot provided on the reel lock at a position facing with and slidably contacting a contact surface of the release pad in a manner allowing rotation of the release pad,
   wherein the pivot and the contact surface are both made of resin, and the contact surface is made of a resin having a higher hardness than the pivot,
   wherein the pivot is made of a resin having Vickers hardness value of 10 to 16, and the contact surface is made of a resin having Vickers hardness value of equal to or greater than 18.

2. A magnetic tape cartridge according to claim 1, wherein the contact surface is made of a different resin than the other parts of the release pad.

3. A magnetic tape cartridge according to claim 2, wherein the pivot is made of a different resin than the other parts of the reel lock.

4. A magnetic tape cartridge according to claim 1, wherein the pivot is made of a different resin than the other parts of the reel lock.

5. A magnetic tape cartridge according to claim 1, wherein the pivot is made of a resin selected from the group consisting of polyacetal (POM), poly buthylene terephthalete (PBT) and nylon, and the contact surface is made of a resin selected from the group consisting of polyacetal (POM), poly buthylene terephthalete (PBT), nylon, fiber-reinforced PTB, fiber-reinforced POM, and fiber-reinforced nylon.

6. A magnetic tape cartridge according to claim 1, wherein the reel lock is made of POM, and the release pad is made of PBT.

7. A magnetic tape cartridge according to claim 1, wherein the contact surface of the release pad is made of fiber-reinforced plastic (FRP).

8. A magnetic tape cartridge comprising:
   a reel around which a magnetic tape is wound;
   a cartridge case rotatably accommodating the reel;
   a reel lock for locking rotation of the reel relative to the cartridge case;

a resilient member urging the reel lock toward the reel to lock the reel;
a release ad for disengaging the reel lock by displacing the reel lock against an urging force of the resilient member, so as to allow rotation of the reel; and
a pivot provided on the reel lock at a position facing with and slidably contacting a contact surface of the release pad in a manner allowing rotation of the release pad,
wherein the pivot and the contact surface are both made of resin, and the contact surface is made of a resin having a higher hardness than the pivot,
wherein the contact surface is made of a different resin than the other parts of the release pad.

9. A magnetic tape cartridge according to claim 8, wherein the pivot is made of a different resin than the other parts of the reel lock.

10. A magnetic tape cartridge according to claim 8, wherein the release pad is made by two-color molding.

11. A magnetic tape cartridge according to claim 8, wherein the pivot is made of a resin selected from the group consisting of polyacetal (POM), poly buthylene terephthalete (PBT) and nylon, and the contact surface is made of a resin selected from the group consisting of polyacetal (POM), poly buthylene terephthalete (PBT), nylon, fiber-reinforced PBT, fiber-reinforced POM, and fiber-reinforced nylon.

12. A magnetic tape cartridge according to claim 11, wherein the pivot is made of a resin having Vickers hardness value of 11 to 13, and the contact surface is made of a resin having Vickers hardness of equal to or greater than 20.

13. A magnetic tape cartridge according to claim 12, wherein the reel lock is made by two-color molding.

14. A magnetic tape cartridge according to claim 13, wherein the release pad is made by two-color molding.

15. A magnetic tape cartridge according to claim 8, wherein the contact surface of the release pad is made of fiber-reinforced plastic (FRP).

16. A magnetic tape cartridge comprising:
a reel around which a magnetic tape is wound;
a cartridge case rotatably accommodating the reel;
a reel lock for locking rotation of the reel relative to the cartridge case;
a resilient member urging the reel lock toward the reel to lock the reel;
a release ad for disengaging the reel lock by displacing the reel lock against an urging force of the resilient member, so as to allow rotation of the reel; and
a pivot provided on the reel lock at a position facing with and slidably contacting a contact surface of the release pad in a manner allowing rotation of the release pad,
wherein the pivot and the contact surface are both made of resin, and the contact surface is made of a resin having a higher hardness than the pivot,
wherein the pivot is made of a different resin than the other parts of the reel lock.

17. A magnetic tape cartridge according to claim 16, wherein the reel lock is made by two-color molding.

18. A magnetic tape cartridge according to claim 16, wherein the pivot is made of a resin selected from the group consisting of polyacetal (POM), poly buthylene terephthalete (PBT) and nylon, and the contact surface is made of a resin selected from the group consisting of polyacetal (POM), poly buthylene terephthalete (PBT), nylon, fiber-reinforced PBT, fiber-reinforced POM, and fiber-reinforced nylon.

19. A magnetic tape cartridge comprising:
a reel around which a magnetic tape is wound;
a cartridge case rotatably accommodating the reel;
a reel lock toy locking rotation of the reel relative to the cartridge case;
a resilient member urging the reel lock toward the reel to lock the reel;
a release pad for disengaging the reel lock by displacing the reel lock against an urging force of the resilient member, so as to allow rotation of the reel; and
a pivot provided on the reel lock at a position facing with and slidably contacting a contact surface of the release pad in a manner allowing rotation of the release pad,
wherein the pivot and the contact surface are both made of resin, and the contact surface is made of a resin having a higher hardness than the pivot,
wherein the pivot is made of a resin having Vickers hardness value of 11 to 13, and the contact surface is made of a resin having Vickers hardness of equal to or greater than 20.

* * * * *